United States Patent
Voss et al.

(10) Patent No.: US 10,571,305 B2
(45) Date of Patent: Feb. 25, 2020

(54) METHOD FOR DETERMINING THE POSITION OF A MAGNET RELATIVE TO A ROW OF SENSORS

(71) Applicant: TE Connectivity Sensors Germany GmbH, Dortmund (DE)

(72) Inventors: Andreas Voss, Dortmund (DE); Oliver Borges, Senden (DE); Armin Meisenberg, Dortmund (DE); Axel Bartos, Waltrop (DE)

(73) Assignee: TE Connectivity Sensors Germany GmbH, Dortmund (DE)

( * ) Notice: Subject to any disclaimer, the term of this patent is extended or adjusted under 35 U.S.C. 154(b) by 337 days.

(21) Appl. No.: 15/448,084

(22) Filed: Mar. 2, 2017

(65) Prior Publication Data
US 2017/0254672 A1 Sep. 7, 2017

(30) Foreign Application Priority Data
Mar. 2, 2016 (DE) .................. 10 2016 002 420

(51) Int. Cl.
*G01D 5/20* (2006.01)
*G01D 5/14* (2006.01)

(52) U.S. Cl.
CPC ........... *G01D 5/2033* (2013.01); *G01D 5/145* (2013.01)

(58) Field of Classification Search
CPC ...................................... G01C 19/00
See application file for complete search history.

(56) References Cited

U.S. PATENT DOCUMENTS

| | | | | |
|---|---|---|---|---|
| 6,731,109 B2 * | 5/2004 | Johnson | ................. | G01D 5/145 324/207.2 |
| 7,441,464 B2 * | 10/2008 | Turnbull | ................. | G01L 1/122 73/146 |
| 8,319,640 B2 * | 11/2012 | McGinnis | ............... | E05B 45/06 340/551 |
| 9,297,634 B2 | 3/2016 | Bartos et al. | | |
| 9,479,134 B2 * | 10/2016 | Reitsma | ................. | G01D 5/202 |
| 9,841,295 B2 * | 12/2017 | Kernebeck | ............. | G01D 5/145 |
| 10,222,237 B2 * | 3/2019 | Lu | ..................... | H01L 21/67259 |

FOREIGN PATENT DOCUMENTS

DE 102012112216 A1 6/2014

OTHER PUBLICATIONS

German Office Action, dated Nov. 24, 2016, 6 pages.
Abstract of DE102012112216, dated Jun. 18, 2014, 1 page.

\* cited by examiner

*Primary Examiner* — Mohamed Charioui
(74) *Attorney, Agent, or Firm* — Barley Snyder

(57) ABSTRACT

The invention relates to a method for determining the position that a magnet has at a time of measurement relative to a row of sensors, wherein a first sensor signal is generated by the first sensor, the value of which depends on the position of the magnet relative to the first sensor, and a second sensor signal is generated by the second sensor, the value of which, depends on the position of the magnet relative to the second sensor. First, the value that the first sensor signal has generated is compared with a first reference value. Second, the value that the second sensor signal has generated is compared with a second reference value. A relative value is formed from the value that the first sensor signal and the value that the second sensor signal. Third, this relative value is compared with a third reference value. From these three steps, the leading signal is chosen to determine the position of the magnet relative to the row of sensors.

12 Claims, 7 Drawing Sheets

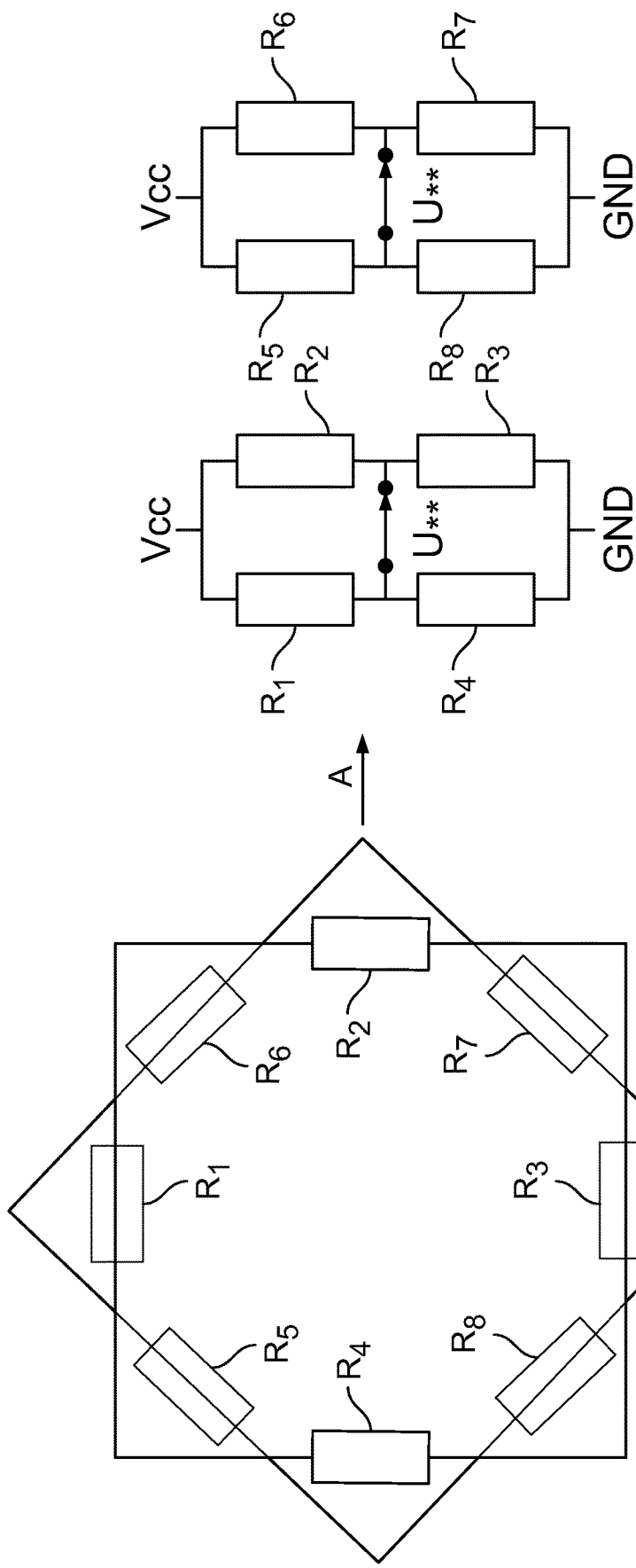

METHOD FOR DETERMINING THE POSITION OF A MAGNET RELATIVE TO A ROW OF SENSORS

CROSS-REFERENCE TO RELATED APPLICATION

This application claims the benefit of the filing date under 35 U.S.C. § 119(a)-(d) of German Patent Application No. 102016002420.8 filed Mar. 2, 2016.

FIELD OF THE INVENTION

The invention relates to a method for determining the position of a magnet a time of measurement relative to a row of sensors.

BACKGROUND

From DE 10 2010 025 170 B4 there is known a method for determining the position of a magnet at a time of measurement relative to a row of sensors extending in a row direction. The position of the magnet relative to the row of sensors can be changed in a direction parallel to the row direction, wherein the row of sensors has a first magnetic-field-sensitive sensor and a second magnetic-field-sensitive sensor, which is arranged, spaced apart from the first sensor in the row direction. In the method known from DE 10 2010 025 170 B4, in one preferred embodiment it is possible for sensors to be employed which are each constructed like the sensor shown in FIGS. 8a), 8b) of DE 10 2010 025 170 B4. Such a sensor has a first part (resistors R1, R2, R3, R4) which generates a first intermediate signal, and a second part (resistors R5, R6, R7, R8) which generates a second intermediate signal, the progression of the first intermediate signal and the progression of the second intermediate signal being dependent on the direction and/or the strength of the magnetic field generated by the magnet at the location of the sensor. The first intermediate signal substantially has a sine-type progression (cf. FIG. 8b) for the applied voltage (U sin)). The second intermediate signal substantially has a cosine-type progression (cf. FIG. 8b) for the applied voltage (U cos)). As can be seen from FIG. 8a, the midpoint of the first part corresponds to the midpoint of the second part. The sine-type and cosine-type signals of the sensor can be used in order to determine the field angle progression. Field angle progression here is understood to mean the progression of the angle which the field direction of a magnetic field, which is generated by a magnet, at the measuring location (at the location of the sensor) assumes relative to a so-called direction of the sensor, such as arises when the magnet passes by the sensor. The direction is a predetermined direction which is meant to simplify the reference. If the field angle is determined at a time of measurement at 30° to the direction, for example, this means that the field direction of the magnetic field generated by the magnet assumes an angle of 30° to the predetermined direction at the measuring location. In the case of the mode of sensor construction known from DE 10 2010 025 170 B4, the field angle emerges in a simple manner through the division of the two signal values, followed by an ArcTangent calculation (field angle=0.5×ARCTAN (Uasin/Uacos)). The embodiment known from DE 10 2010 025 170 B4 additionally offers the advantage that, via the relationship Uasin×Uasin+Uacos×Uacos=constant, it is possible to check, for each individual sensor, whether the sensor signal is correct.

The method proposed in DE 10 2010 025 170 B4 envisions that, in order to determine the position, the sensor signals of a plurality of sensors, in one embodiment the sensor signals of all sensors, of the row of sensors, are evaluated. As depicted in FIG. 1 and FIG. 2 of DE 10 2010 025 170 B4, the method proposed therein is based on generating a sensor signal of the entire device, which sensor signal is composed of the individual measured values of the individual sensors at the time of measurement (FIG. 2). In the method described therein, an examination is then performed regarding by which amount and in which direction the progression of the thus-generated sensor signal of the entire device and the progression of a reference signal have to be displaced relative to one another in order to achieve a congruence between the thus-generated sensor signal of the entire device, and the reference signal. The position of the magnet in which it is situated at the time of measurement is ascertained from the amount and the direction.

A possible disadvantage with the present method can be the calculation effort which has to be employed in order to establish in the evaluation unit the amount by which and the direction in which the progression of the sensor signal and the progression of the reference signal have to be displaced relative to one another in order to achieve congruence between the sensor signal and the reference signal.

SUMMARY

Against this background, an object of the invention is to propose a simplified method for determining the position of a magnet at a time of measurement relative to a row of sensors extending in a row direction.

The invention starts from the basic idea that it is possible to determine, from the sensor signal of just one sensor, the position of the magnet at the time of measurement relative to the row of sensors, but that if there are at least two magnetic-field-sensitive sensors which are arranged spaced apart from one another in the row direction, it is necessary to establish which of the sensor signals should be regarded as the leading signal for the time of measurement. The invention therefore proposes, inter alia, a way to determine the sensor signal which must be regarded as the leading signal at the time of measurement.

The method according to the invention therefore proposes, in a first examination, comparing the value that the first sensor signal has generated at the time of measurement with a first reference value and/or checking whether it belongs to a first value range. The belonging to a first value range can for example be established by checking whether the value of the first sensor signal is above a lower threshold of the first value range and below an upper threshold of the first value range. If this is the case, then the value of the first sensor signal belongs to the first value range. The comparison with a first reference value can be carried out such that a check is performed as to whether the value of the first sensor signal corresponds to the first reference value. In another embodiment, the comparison with a first reference value can be carried out such that a check is performed as to whether the value of the first sensor signal is greater than the first reference value. In another embodiment, the comparison with a first reference value can be carried out such that a check is performed as to whether the value of the first sensor signal is smaller than the first reference value.

As a further step, the method according to the invention proposes, in a second examination, comparing the value that the second sensor signal has generated at the time of measurement with a second reference value and/or checking whether it belongs to a second value range. The belonging to a second value range can for example be established by checking whether the value of the second sensor signal is above a lower threshold of the second value range and below an upper threshold of the second value range. If this is the case, then the value of the second sensor signal belongs to the second value range. The comparison with a second reference value can be carried out such that a check is performed as to whether the value of the second sensor signal corresponds to the second reference value. In another embodiment, the comparison with a second reference value can be carried out such that a check is performed as to whether the value of the second sensor signal is greater than the second reference value. In another embodiment, the comparison with a second reference value can be carried out such that a check is performed as to whether the value of the second sensor signal is smaller than the second reference value. In an embodiment, the first reference value corresponds to the second reference value, or the first value range corresponds to the second value range.

Furthermore, in a first alternative, the method according to the invention proposes forming a relative value from the value that the first sensor signal has generated at the time of measurement and the value that the second sensor signal has generated at the time of measurement. This alternative is employed in particular for magnetic-field-sensitive sensor types, which have a single full Wheatstone bridge or a single Wheatstone half-bridge and in which the sensor signal of the sensor is generated from a signal tapped from one of this full Wheatstone bridge or Wheatstone half-bridge. In a second alternative, the method according to the invention proposes that a relative value be formed from the value of a first intermediate signal of the first sensor at the time of measurement, which has been used to generate the value of the first sensor signal, and from the value of a second intermediate signal of the first sensor at the time of measurement, which has been used to generate the value of the first sensor signal, and from the value of a first intermediate signal of the second sensor at the time of measurement, which has been used to generate the value of the first sensor signal, and from the value of a second intermediate signal of the second sensor at the time of measurement, which has been used to generate the value of the second sensor signal. This alternative is employed in particular for magnetic-field-sensitive sensor types which are constructed from at least two parts, a first part having a full Wheatstone bridge or a Wheatstone half-bridge, from which the first intermediate signal is tapped, and a second part having a full Wheatstone bridge or a Wheatstone half-bridge, from which the second intermediate signal is tapped, and in which sensor types generation of the sensor signal is performed from the first intermediate signal and the second intermediate signal.

The method according to the invention envisages, in a third examination, comparing the relative value generated according to one of the two alternatives with a third reference value and/or checking whether it belongs to a third value range. The belonging to a third value range can for example be established by checking whether the value of the relative value is above a lower threshold of the third value range and below an upper threshold of the third value range. If this is the case, then the value of the relative value belongs to the third value range. The comparison with a third reference value can be carried out such that a check is performed as to whether the value of the relative value corresponds to the third reference value. In another embodiment, the comparison with a third reference value can be carried out such that a check is performed as to whether the value of the relative value is greater than the third reference value. In another embodiment, the comparison with a third reference value can be carried out such that a check is performed as to whether the value of the relative value is smaller than the third reference value. In an embodiment, the third reference value does not correspond to the first reference value. In an embodiment, the third reference value does not correspond to the second reference value. In a preferred embodiment, the third value range does not correspond to the first value range. In an embodiment, the third value range does not correspond to the second value range.

A multiplicity of algorithms is conceivable for generating the relative value. For example, the relative value can be the average value from the value that the first sensor signal has generated at the time of measurement and the value that the second sensor signal has generated at the time of measurement. To do this, the values can be added and then divided by 2. The relative value can also be generated by comparison of the values. For example, the relative value can contain the information on whether the value that the first sensor signal has generated at the time of measurement is greater than the value that the second sensor signal has generated at the time of measurement. In such an examination, the relative value can preferably be a binary value, for example assume the value 1, if the value that the first sensor signal has generated at the time of measurement is greater than the value that the second sensor signal has generated at the time of measurement and is otherwise 0. The relative value can likewise be generated by forming a ratio of the value that the first sensor signal has generated at the time of measurement and the value that the second sensor signal has generated at the time of measurement. For this purpose, for example, the value that the first sensor signal has generated at the time of measurement can be divided by the value that the second sensor signal has generated at the time of measurement. This alternative is employed in particular for magnetic-field-sensitive sensor types, which have a single full Wheatstone bridge or a single Wheatstone half-bridge and in which the sensor signal of the sensor is generated from a signal tapped from one of this full Wheatstone bridge or Wheatstone half-bridge.

In the case of magnetic-field-sensitive sensor types constructed from at least two parts, a first part having a full Wheatstone bridge or a Wheatstone half-bridge, from which the first intermediate signal is tapped, and a second part having a full Wheatstone bridge or a Wheatstone half-bridge, from which the second intermediate signal is tapped, and in which the sensor signal is generated from the first intermediate signal and the second intermediate signal, it is also conceivable, as part of the formation of the relative value, to generate an amplitude (A) for the first sensor signal and an amplitude for the second sensor signal, the amplitude (A) being calculated from the square root of the sum of the square of the value (W1) of the first intermediate signal and of the square of the value (W2) of the second intermediate signal of a sensor at the time of measurement (A=(W1$^2$+W2$^2$)1/2). The relative value can then be generated from the amplitude of the first sensor signal (hereafter: first amplitude) and from the amplitude of the second sensor signal (hereafter: second amplitude). For example, the relative value can be the average value from the first amplitude and the second amplitude at the time of measurement. For this purpose, the first amplitude and the second amplitude can be added and then divided by 2. The relative value can also be generated by comparing the first amplitude to the second amplitude. For example, the relative value can contain the information on whether the first amplitude at the time of measurement is greater than the second amplitude. In such an examination, the relative value can preferably be a binary value, for example can assume the value 1 if the first amplitude at the time of measurement is greater than the second amplitude, and is otherwise 0. The relative value can likewise be formed by forming ratios of the amplitudes. For this purpose, the first amplitude can, for example, be divided by the second amplitude at the time of measurement.

The method according to the invention then proposes determining from the result of the first examination and the result of the second examination and the result of the third examination, which of the sensor signals should be regarded as the leading signal for the time of measurement. From the result of the first examination and the result of the second examination and the result of the third examination, it is therefore possible to determine whether the first sensor signal or the second sensor signal should be regarded as the leading signal for the time of measurement. The method according to the invention envisages determining the position of the magnet relative to the row of sensors at the time of measurement by evaluating the leading sensor signal which is thus determined.

The method according to the invention can be employed for various measuring tasks which differ in the precision with which it is intended to determine the position of the magnet relative to the row of sensors. Measuring tasks are conceivable in which it is sufficient to establish that the magnet is situated, relative to the row of sensors, in a region in which the one sensor supplies good sensor signals. For example, it is conceivable that the sensors are arranged clearly spaced apart from one another on the row of sensors. In such a situation, the first sensor, for example, can supply a strong and well evaluable signal, if the magnet is situated in a region close to the first sensor, while the second sensor supplies a weak signal at this point in time. With the method according to the invention, it can be established that, in this situation, the signal of the first sensor should be used as the leading signal. This information can be sufficient in the case of some measuring tasks, for example when, in the case of a piston which can assume two set positions, the intention is to establish in which of the two positions the piston is situated. For this purpose, the piston can be used with a magnet and the row of sensors can be attached in a fixed manner. For such a measuring task, it can be sufficient to establish that the magnet (and thus the piston) is situated in the region of the one sensor. Since the piston—in the example chosen here—can assume only two predefined spaced-apart positions, it can be sufficient for this measuring task to determine only the one signal as the leading signal and thus to determine that the piston is situated close to the first sensor, in order to perform the measuring task of determining the position.

In an alternative measuring task it is not sufficient to determine only one of the sensors as being the one which the magnet is situated close to. In this alternative measuring task, the position of the magnet is determined as well as possible relative to the sensor which supplies the leading signal. Even one individual magnetic-field-sensitive sensor can—even if only with a small degree of precision—determine the position which a magnet has relative to it at a time of measurement. In this case, there are certain types of magnetic-field-sensitive sensors which can supply a non-unique signal, e.g. which can output only one of two conceivable relative positions as the result. There can likewise be constraints with regard to the maximum distance which the magnet can assume from the sensor while still leading to a useable result. However, here too, it is possible to conceive of measuring tasks in which this information is already sufficient, due to constraints caused by the installation, for example, which by themselves already prevent the occurrence of the second of two identical results caused by the two sensor type, for example because the magnet cannot actually assume the position in which the sensor would generate the second signal which is identical to a first signal and which thus would lead to a lack of uniqueness.

Magnetic-field-sensitive sensors, for example Hall sensors, inductive sensors, in particular preferably coil-based sensors, magnetoresistors (sensors which utilize the Gauss effect) or magneto-optical sensors are known which can determine, at the location of the sensor, the strength of the magnetic field which a magnet generates. Such sensors can be employed to carry out the method according to the invention. The strength of the magnetic field generated by a magnet at a point in its surroundings depends on the distance between the magnet and this point. The further away the magnet is from this point, the weaker the magnetic field becomes. Such a magnetic-field-sensitive sensor can thus be employed to establish how closely the magnet is situated to the sensor. This measurement can lead to ambiguous measurement results because the sensor theoretically outputs the same signal multiple times, even if the magnet is situated in different positions, i.e. always outputs the same signal when the magnet is situated at the same distance relative to the sensor—albeit in a different space. The unambiguity of the measurement result in the case of such a magnetic-field-sensitive sensor can be increased by restricting the possibilities for movement of the magnet relative to the row of sensors. For example, if the magnet is guided such that the position of the magnet relative to the row of sensors can be changed only in a direction parallel to the row of sensors, then ambiguities do arise when the aforementioned magnetic-field-sensitive sensors are employed, because the sensor signal can assume the same value, in terms of amount, twice. In the case of such a structure, the magnet can have the same spacing relative to the sensor twice, namely once when the magnet is situated to the right or (depending on the viewing direction chosen) in front of the sensor by said spacing and once when the magnet is situated to the left, or rather (depending on the viewing direction chosen) behind the sensor, by the same amount. However, depending on the measuring task set, this too can be sufficient to determine, with sufficient accuracy for the measuring task, the position which the magnet assumes relative to the row of sensors at the time of measurement. Or provisions are made in the case of such a measuring task so that the magnet is not at all able to assume the respective second positions.

In an alternative embodiment, the magnetic-field-sensitive sensor can determine the field direction which the magnetic field generated by the magnet has at the location of the sensor relative to a preferred direction. Such sensors can be configured as rotation angle sensors. Various designs of rotation angle sensors are known. One frequently employed design consists of a sensor with two Wheatstone half-bridges or two full Wheatstone bridges of magnetic-field-sensitive resistors. The resistors can have the "anisotropic magnetoresistive effect" (AMR effect) or the "giant" magnetoresistive effect (GMR effect), for example. If the sensor is equipped with two Wheatstone half-bridges or with two full Wheatstone bridges and if resistors which utilize the AMR effect are used, then the sensor can precisely determine the field direction within 180°, but has an indeterminateness. Each value measured by such a sensor appears once for a field direction at an angle from 0° to 180° in a reference coordinate system and once for a field direction which points in a direction from 180° to 360° in the same reference coordinate system. However, it is possible to conceive of measuring tasks for which it is sufficient to determine the position which the magnet occupies relative to the row of sensors with such an ambiguity. It is therefore also possible to employ such sensors in order to realize the method according to the invention. Precisely in the case of measuring tasks, in which a magnet is moved in the direction of the row direction or in a direction parallel to the row direction of a row of sensors, the field direction of the magnetic field generated by the magnet at the location of the respective sensor of the row of sensors changes by a maximum of 180° during this relative movement.

In a particularly preferred type, rotation angle sensors are employed which supply a measurement signal which is unique across all possible field directions (0° to 360°). This is, for example, achieved with sensors which have two Wheatstone half-bridges or two full Wheatstone bridges of magnetic-field-sensitive resistors, wherein the resistors employ the "giant" magnetoresistive effect (GMR Effect).

In an alternative embodiment of a magnetic-field-sensitive sensor which determines the field direction which the magnetic field generated by the magnet has at the location of the sensor relative to a preferred direction, it is possible to employ so-called linear field sensors which have a Wheatstone half-bridge or a full Wheatstone bridge of magnetic-field-sensitive resistors.

A rotation angle sensor can have a part which has four resistors interconnected to form a full Wheatstone bridge and which generates a first intermediate signal, and a second part which has four resistors interconnected to form a full Wheatstone bridge and which generates a second intermediate signal, the progression of the first intermediate signal and the progression of the second intermediate signal being dependent on the direction and/or the strength of the magnetic field generated by the magnet at the location of sensor. The first intermediate signal substantially has a sine-type progression. The second intermediate signal substantially has a cosine-type progression. The midpoint of the first part corresponds to the midpoint of the second part. The sine- and cosine-type signals of the sensor can be used in order to determine the field angle progression. Field angle progression here is understood to mean the progression of the angle which the field direction of a magnetic field generated by a magnet has at the measuring location (at the location of the sensor) relative to a so-called preferred direction of the sensor, such as it arises when the magnet passes by the sensor. The preferred direction is a predetermined direction which is meant to simplify the reference. If the field angle, at a time of measurement, is determined for example at 30° to the preferred direction, this means that the field direction of the magnetic field generated by the magnet assumes, at the measuring location, an angle of 30° to the predetermined direction. The field angle is obtained in a simple manner through the division of the two signal values, followed by an ArcTangent calculation (field angle=0.5×ARCTAN (Uasin/Uacos)). Rotation angle sensors having two parts, each part having a full Wheatstone bridge according to the aforementioned type, supply, within a linear measuring region which extends over a measuring subregion on one side of the sensor and a measuring subregion on the other side of the sensor, a unique signal, which depends on the position of the magnet relative to the sensor. The size of the measuring region substantially depends on the size of the magnet in the row direction. For example, sensors (KMT32B—rotation angle sensor, MEAS Deutschland GmbH or KMZ41, NXP) are known which, when a magnet of 15 mm length is used, can supply a unique signal in a linear measuring region of approx. −12 mm to +12 mm around the middle of such a sensor, from which it is possible to unambiguously determine the magnets relative to the sensor. However, combinations of magnets (size of the magnet in row direction) and magnet-field-sensitive sensors are known which, in a linear measuring region of a few millimeters around the middle of such a sensor, supply a unique signal from which the magnets can be unambiguously determined relative to the sensor. However, combinations of magnets (size of the magnet in row direction) and magnet-field-sensitive sensors are known which, in a linear measuring region of some centimeters around the middle of such a sensor, can supply a unique signal from which the magnets can be unambiguously determined relative to the sensor.

In an embodiment, the sensors of this design are arranged such that the preferred direction of each sensor points in the same direction. This can reduce the required calculation effort and make it possible to avoid additional calculation operations, which would otherwise be required to make the signals comparable.

Rotation angle sensors having two parts, each part having a full Wheatstone bridge according to the aforementioned type, supply, within a linear measuring region which extends over a measuring subregion on one side of the sensor and a measuring subregion on the other side of the sensor, a unique signal, which depends on the position of the magnet relative to the sensor. Regions in which the sensor does not supply any easily evaluable signal frequently join onto this linear measuring region (see the comments regarding FIG. 5 for understanding by way of example). In an embodiment, the sensors of the row of sensors, if they are rotation angle sensors of this type, are arranged such that the end regions of their linear measuring regions overlap. As a result, a linear measuring space is provided which is composed of the individual linear measuring regions of the individual sensors and within which the determination of the position of the magnet can take place safely and without gaps. This rule of interpretation can also be employed for the following embodiments of a row of sensors having more than two, in particular more than three sensors, which are arranged spaced apart from one another on a row of sensors.

The method according to the invention can be employed for a row of sensors which has only a first magnetic-field-sensitive sensor and a second magnetic-field-sensitive sensor. In an embodiment, however, the method according to the invention is employed in a row of sensors which has at least one more, third magnetic-field-sensitive sensor and which, in one preferred embodiment, has more than three magnetic-field-sensitive sensors, which are arranged spaced apart from one another in the row direction. In the case of such a row of sensors, the method according to the invention can envisage that a third sensor signal is generated by the third sensor, the value of which, at the time of measurement, depends on the position of the magnet relative to the third sensor at the time of measurement, and in a fourth examination, the value that the third sensor signal has generated at the time of measurement is compared with a fourth reference value and/or is checked as to whether it belongs to a fourth value range, and either a second relative value is formed from the value that the second sensor signal has generated at the time of measurement, or the value that the first sensor signal has generated at the time of measurement, and the value that the third sensor signal has generated at the time of measurement, or a second relative value is formed from the value of a first intermediate signal of the second sensor at the time of measurement that has been used to generate the value of the second sensor signal, and from the value of a second intermediate signal of the second sensor at the time of measurement that has been used to generate the value of the second sensor signal, or from the value of a first intermediate signal of the first sensor at the time of measurement that has been used to generate the value of the first sensor signal, and from the value of a second intermediate signal of the first sensor at the time of measurement that has been used to generate the value of the first sensor signal, and from the value of a first intermediate signal of the third sensor at the time of measurement that has been used to generate the value of the third sensor signal, and from the value of a second intermediate signal of the third sensor at the time of measurement that has been used to generate the value of the third sensor signal, and in a fifth examination, the second relative ascertained in this manner value is compared with a fifth reference value and/or is checked as to whether it belongs to a fifth value range, and from the result of the first examination and the result of the second examination and the result of the third examination and the result of the fourth examination and the result of the fifth examination, a determination is carried out as to which of the sensor signals should be regarded as the leading signal for the time of measurement, wherein the position of the magnet relative to the row of sensors at the time of measurement is determined by evaluating the leading signal determined in this manner.

This preferred embodiment proposes, in a fourth examination, comparing the value that the third sensor signal has generated at the time of measurement with a fourth reference value and/or checking as to whether it belongs to a fourth value range. The belonging to a fourth value range can for example be established by checking whether the value of the third sensor signal is above a lower threshold of the fourth value range and below an upper threshold of the fourth value range. If this is the case, then the value of the third sensor signal belongs to the fourth value range. The comparison with a fourth reference value can be carried out such that a check is performed as to whether the value of the third sensor signal corresponds to the fourth reference value. In another embodiment, the comparison with a fourth reference value can be carried out such that a check is performed as to whether the value of the third sensor signal is greater than the fourth reference value. In another embodiment, the comparison with a fourth reference value can be carried out such that a check is performed as to whether the value of the third sensor signal is smaller than the fourth reference value. In a particularly preferred embodiment, the first reference value corresponds to the second reference value, or the first value range corresponds to the second value range.

The method according to the invention further proposes forming a second relative value in which the measuring result of the first sensor is put into relation with the measuring result of the third sensor or alternatively the measuring result of the second sensor is correlated with the measuring result of the third sensor. A first alternative proposes forming a (second) relative value from the value that the second sensor signal has generated at the time of measurement, or the value that the first sensor signal has generated at the time of measurement, and the value that the third sensor signal has generated at the time of measurement. This alternative is employed in particular for magnetic-field-sensitive sensor types, which have a single full Wheatstone bridge or a single Wheatstone half-bridge and in which the sensor signal of the sensor is generated from a signal tapped from one of this full Wheatstone bridge or Wheatstone half-bridge. In a second alternative, the method according to the invention proposes that a (second) relative value be formed from the value of a first intermediate signal of the second sensor at the time of measurement that has been used to generate the value of the second sensor signal, and from the value of a second intermediate signal of the second sensor at the time of measurement that has been used to generate the value of the second sensor signal, or from the value of a first intermediate signal of the first sensor at the time of measurement that has been used to generate the value of the first sensor signal, and from the value of a second intermediate signal of the first sensor at the time of measurement that has been used to generate the value of the first sensor signal, and from the value of a first intermediate signal of the third sensor at the time of measurement that has been used to generate the value of the third sensor signal, and from the value of a second intermediate signal of the third sensor at the time of measurement that has been used to generate the value of the third sensor signal. This alternative is employed in particular for magnetic-field-sensitive sensor types constructed from at least two parts, a first part having a full Wheatstone bridge or a Wheatstone half-bridge, from which the first intermediate signal is tapped, and a second part having a full Wheatstone bridge or a Wheatstone half-bridge, from which the second intermediate signal is tapped, and in which the sensor signal is generated from the first intermediate signal and the second intermediate signal.

A plurality of algorithms is conceivable for generating the relative value. For example, the second relative value can be the average value from the value that the second sensor signal has generated at the time of measurement or that the first sensor signal has generated at the time of measurement, and the value that the third sensor signal has generated at the time of measurement. To do this, the values can be added and then divided by 2. The second relative value can also be generated by comparison of the values. For example, the second relative value can contain the information on whether the value that the second sensor signal has generated at the time of measurement, or whether the value that the first sensor signal has generated at the time of measurement, is greater than the value that the third sensor signal has generated at the time of measurement. In such an examination, the second relative value can preferably be a binary value, for example assume the value 1, if the value that the second sensor signal has generated at the time of measurement, or the value that the first sensor signal has generated at the time of measurement, is greater than the value that the third sensor signal has generated at the time of measurement and is otherwise 0. The second relative value can likewise be generated by forming a ratio of the value that the second sensor signal has generated at the time of measurement, or the value that the first sensor signal has generated at the time of measurement, and the value that the third sensor signal has generated at the time of measurement. For this purpose, for example, the value that the second sensor signal has generated at the time of measurement, or the value that the first sensor signal has generated at the time of measurement, can be divided by the value that the third sensor signal has generated at the time of measurement. This alternative is employed in particular for magnetic-field-sensitive sensor types, which have a single full Wheatstone bridge or a single Wheatstone half-bridge and in which the sensor signal of the sensor is generated from a signal tapped from one of this full Wheatstone bridge or Wheatstone half-bridge.

In the case of magnetic-field-sensitive sensor types constructed from at least two parts, a first part having a full Wheatstone bridge or a Wheatstone half-bridge, from which the first intermediate signal is tapped, and a second part having a full Wheatstone bridge or a Wheatstone half-bridge, from which the second intermediate signal is tapped, and in which the sensor signal is generated from the first intermediate signal and the second intermediate signal, it is also conceivable, as part of the formation of the second relative value, to generate an amplitude (A) for the second sensor signal or an amplitude (A) for the first sensor signal and an amplitude for the third sensor signal, the amplitude (A) being calculated from the square root of the sum of the square of the value (W1) of the first intermediate signal and of the square of the value (W2) of the second intermediate signal of a sensor at the time of measurement (A=(W1$^2$+W2$^2$)1/2). The second relative value can then be generated from the amplitude of the second sensor signal (hereafter: second amplitude) or from the amplitude of the first sensor signal (hereafter: first amplitude) and from the amplitude of the third sensor signal (hereafter: third amplitude). For example, the second relative value can be the average value from the second amplitude, or the first amplitude, and the third amplitude at the time of measurement. For this purpose, the second amplitude, or the first amplitude, and the third amplitude can be added and then divided by 2. The second relative value can also be generated by comparing the second amplitude, or the first amplitude, to the third amplitude. For example, the relative value can contain the information on whether the second amplitude, or the first amplitude at the time of measurement is greater than the third amplitude. In such an examination, the second relative value can preferably be a binary value, for example can assume the value 1, if the second amplitude, or the first amplitude at the time of measurement is greater than the third amplitude, and is otherwise 0. Likewise, an embodiment can be chosen in which the second relative value assumes the value 1 if the third amplitude is greater than the second amplitude, or the first amplitude, at the time of measurement, and is otherwise 0. The second relative value can likewise be formed by forming ratios of the amplitudes. For example, the second amplitude, or the first amplitude, can, for this purpose, be divided by the third amplitude at the time of measurement. Likewise, the third amplitude can for example be divided by the second or by the first amplitude at the time of measurement.

The method according to the invention envisages, in a fifth examination, comparing the second relative value generated according to one of the two alternatives with a fifth reference value and/or checking whether it belongs to a fifth value range. The belonging to a fifth value range can for example be established by checking whether the value of the second relative value is above a lower threshold of the fifth value range and below an upper threshold of the fifth value range. If this is the case, then the value of the second relative value belongs to the fifth value range. The comparison with a fifth reference value can be carried out such that a check is performed as to whether the value of the second relative value corresponds to the fifth reference value. In another embodiment, the comparison with a fifth reference value can be carried out such that a check is performed as to whether the value of the second relative value is greater than the fifth reference value. In another embodiment, the comparison with a fifth reference value can be carried out such that a check is performed as to whether the value of the second relative value is smaller than the fifth reference value. In an embodiment, the fifth reference value does not correspond to the first reference value. In an embodiment, the fifth reference value does not correspond to the second reference value. In an embodiment, the fifth reference value does not correspond to the fourth reference value. In an embodiment, the third reference value corresponds to the fifth reference value. In an embodiment, the fifth value range does not correspond to the first value range. In an embodiment, the fifth value range does not correspond to the second value range. In an embodiment, the fifth value range corresponds to the third value range. In an embodiment, the fifth value range does not correspond to the fourth value range.

In an embodiment, in the case of a row of sensors having at least three sensors, the previously described preferred embodiment is carried out with a fourth examination and a fifth examination. However, it is possible to achieve the advantages of the invention even if, in the case of a row of sensors having three or more magnetic-field-sensitive sensors, the method variant is performed in which only a first examination, a second examination and a third examination are performed. If the method according to the invention is meant to be carried out on a row of sensors with more than three sensors, it is established in an embodiment whether that method variant is employed which is reduced in terms of the calculation effort and in which only the first examination, the second examination and the third examination are carried out, or whether the method variant with the additional fourth examination and the additional fifth examination, which is more complex in terms of calculation effort, is carried out. This decision dictates whether it is necessary, in an upstream selection step, to determine two sensors or three sensors, the sensor signals of which are meant to be employed in the further method steps. If the reduced method variant is carried out, then, in the case of a row of sensors having a plurality of magnetic-field-sensitive sensors, it is necessary to determine, in a selection step, those two sensors of which the sensor signals are meant to be used in the further method steps for this time of measurement. If the method variant having the fourth examination and the fifth examination, which is more complex in terms of calculation effort, is employed, then, in the case of a row of sensors having a plurality of magnetic-field-sensitive sensors, it is necessary to determine, in a selection step, those three sensors of which the sensor signals are meant to be employed in the further method steps for this measuring point. In an embodiment, when carrying out the selection step, it is established which two sensors supply sensor signals with the highest values in terms of amount, or which three sensors supply sensor signals with the highest values in terms of amount, compared to the other sensors. The values of the sensor signals of these sensors then form the basis of the further method for this time of measurement.

In an embodiment, a lookup table (a conversion table) is employed when determining which of the sensor signals should be regarded as the leading signal for the time of measurement. The results of the first examination, the second examination, the third examination and—insofar as the more complex method variant is used—the fourth examination and the fifth examination can be used to form a value combination. The value combination can for example be formed such that a row of numbers is formed with three places, or five places, with the result of the first examination being placed in the first place, the result of the second examination being placed in the second place, the result of the third examination being placed in the third place and—if carried out—the result of the fourth examination being placed in the fourth place and the result of the fifth examination being placed in the fifth place. If the results of the examinations are binary values, then a value combination composed of ones and zeros can be formed thereby. The value combination generated in this manner can be compared with value combinations stored in a lookup table. For example, one entry may be stored in the lookup table for each conceivable value combination regarding which signal from an array of first sensor signals, second sensor signals and—if used—third sensor signals should be regarded as the leading signal when the examination carried out has output the corresponding value combination.

As described above, it is possible to conceive of embodiments of the method according to the invention in which the measuring regions of the individual sensors overlap at their respective end regions to secure a measuring region without gaps. In such cases, a particular embodiment of the method according to the invention is conceivable in which one entry may be stored in the lookup table for each conceivable value combination regarding which signal from the array made up of the first sensor signal, the second sensor signal and—if used—the third sensor signal should be regarded as the leading signal when the examination carried out has output the corresponding value combination or whether the corresponding value combination means that the magnet is situated in an overlapping region of two sensor signals. The information that the magnet is situated in an overlapping region of two sensor signals can be taken into account when determining the precise position of the magnet from the sensor signals.

In an embodiment, the position of the magnet relative to the row of sensors at the time of measurement is determined in that, to the value of the leading signal or regarding a value derived from the value of the leading signal, a position value for determining the position of the magnet relative to the row of sensors is read out from a lookup table. Several embodiments are conceivable for the configuration of the lookup table. In a first embodiment, a position of the magnet is stored relative to each value of each sensor signal. In the case of measuring tasks with large rows of sensors, this leads to very large lookup tables. In this embodiment, it is, for example, possible to store in the lookup table that if, for example, the signal of the second sensor should be regarded as the leading signal and if the value of the second sensor signal is 0.4V, this corresponds to a magnet position of 27 mm along the row of sensors. The storage of individual values for the position of the magnet for each value of each sensor signal makes it possible to take differences between the sensors, for example differences in type or even differences caused during manufacture, into account when generating the values or offsets. The filling of the lookup table or the adaptation of values already in the lookup table can take place during a calibration run. In a second embodiment, it is possible to work with a smaller lookup table, for example if all sensors are of the same type of construction. If the sensors are of the same type, it is to be expected that the sensors will behave the same if the magnet is guided through their respective measuring regions. An incremental change in the position of the magnet in the respective measuring regions should lead to the same change in the value of the generated sensor signals of the respective sensor. The use of a lookup table from which it is possible to read out where the magnet is situated in the measuring region of the sensor when the sensor supplies a signal with a determined value, is convenient. This information on the leading sensor's location within the measuring regions therefore can be linked to the information on the position of the leading sensor along the row of sensors and thus the absolute position of the magnet can be determined. If it is read out from the lookup table for example that the currently generated value of the second sensor which should be viewed as leading corresponds to a positioning of the magnet 7 mm to the left of the reference point of the second sensor (usually the midpoint of the sensor) and if it is known (for example by looking up in a further lookup table) that the reference point of the second sensor is 20 mm away from the left edge of the row of sensors, then it can be ascertained from this information that the magnet is 13 mm away from the left edge of the row of sensors. In this embodiment, the lookup table contains a juxtaposition of possible values of a sensor signal to positions of the magnet in the measuring region of the sensor relative to a reference point only once. In this embodiment, this lookup table is accessed regardless of which sensor is determined to be leading. Here, the invention makes use of the exemplary embodiment's fact that all of the sensors are of the same type and consequently react the same. As a result, the scope of the lookup table can be reduced. The provision of a further lookup table which contains the position of the reference point of the respective sensor relative to the row of sensors and thus specifies the value to which the value read out from the first lookup table has to be added in order to ascertain the absolute position of the magnet relative to the row of sensors, can also be kept small and in essence contains one entry for each sensor. When employing that second embodiment of the lookup table which is described here, it can be necessary to compensate for differences, caused during manufacture, between the sensors of the same type in order to be able to employ one single lookup table for all sensors. An embodiment therefore envisages determining the position of the magnet relative to the row of sensors at the time of measurement in that, regarding a value derived from the value of the leading signal, a position value for determining the position of the magnet relative to the row of sensors is read out from a lookup table. The derived value can be generated by factoring in a calibration factor. The generation of derived values can serve to increase the comparability of the values. It is known that magnetic-field-sensitive sensors can have offsets caused during manufacture or can have different amounts in the same magnet position, depending on the ambient temperature. These differences due to manufacture or surroundings, which can even be different from sensor to sensor when the surrounding conditions are identical, can be eliminated or at least reduced by generating derived values. Thus, in a calibration measurement, it is conceivable to determine an individual calibration value for each sensor at known ambient conditions and known position of the magnet. The derived value can, for example, be generated by the value which the respective signal has generated at the time of measurement being divided by the respective calibration value for the respective sensor. An alternative method can for example consist of standardizing the values. For this purpose, it is possible to examine which of the two values, i.e. the value that the first sensor signal has generated at the time of measurement and the value that the second sensor signal has generated at the time of measurement, is the greater value. As soon as this value is determined, both values can be divided by this value. This leads to the derived signal from the sensor which had the greater value at the time of measurement becoming one, while the derived value of the sensor which supplied the lower signal at the time of measurement becomes smaller than 1 in terms of amount. Such normalization may add additional calculation operations when generating the relative value. However, depending on the method selected for generating the actual relative value, such normalization can also simplify the calculation operations which furthermore need to be carried out.

In an embodiment in which a relative value is formed from the value of a first intermediate signal of the first sensor at the time of measurement, which has been used to generate the value of the first sensor signal, and from the value of a second intermediate signal of the first sensor at the time of measurement, which has been used to generate the value of the first sensor signal, and from the value of a first intermediate signal of the second sensor at the time of measurement, which has been used to generate the value of the second sensor signal, and from the value of a second intermediate signal of the second sensor at the time of measurement, which has been used to generate the value of the second sensor signal, calibration and consideration of offsets due to manufacture or of influences of the ambient temperature or influences of the forwarding of the signal to an A/D converter (if an A/D converter is employed to convert the respective intermediate signal into a digital intermediate signal) can take place in that the respective intermediate signal is calibrated, particularly preferably by an offset value being subtracted from the intermediate signal or being added to the intermediate signal and/or by the intermediate signal being multiplied by a calibration factor. If an offset value is subtracted from the intermediate signal or is added to the intermediate signal and the intermediate signal is multiplied by a factor, then the multiplication by the calibration factor can take place before or after the subtraction or addition of the offset value depending on which effect is meant to be compensated for by the multiplication by the calibration factor.

In an embodiment which is an alternative to employing lookup tables, the position of the magnet relative to the row of sensors at the time of measurement can be determined by the value of the leading signal or a value derived from the value of the leading signal being employed in a formula. In the case of some sensors, it is possible to express the relationship between the respective value of the sensor signal and the corresponding position of the magnet in the measuring region of the sensor in a formula, or by producing a linear correlation by employing derived values. This then makes it possible to determine the position of the magnet in the measuring region of the sensor by inserting the value generated at the time of measurement into the formula.

If an embodiment of the above-described type with overlapping regions is used, then, in a particularly preferred embodiment, it is conceivable to form the position of the magnet relative to the row of sensors, in a situation in which it has been ascertained that the magnet is situated in an overlapping region, from the value of the sensor signal of one sensor, to the measuring region of which the overlapping region belongs, from the value of the sensor signal of the other sensor, to the measuring region of which the overlapping region belongs. For example, the average value can be formed from both values and the value ascertained in this manner can be employed in the lookup table. It is likewise conceivable to ascertain in the lookup table, with regard to the value of the signal of one sensor, to which position of the magnet this value corresponds, and to ascertain in the lookup table, with regard to the value of the signal of the other sensor, to which position of the magnet this value corresponds, and to form an average value from these two positions.

It is possible to conceive of instances of application in which the row of sensors is integrated into a rod and defines a row extending parallel to the row direction on the surface of the rod as a measuring path, and the measuring task is set of finding out which point along this measuring path a magnet, which is designed in an annular shape and which is displaceable along the rod, is closest to in the position which is to be determined. Since the relative position of the magnet relative to the row of sensors is meant to be able to be changed in the direction of the row direction or in a direction parallel to the row direction, a clearance is preferably provided between the magnet and the rod in such an embodiment, so that if necessary there is no direct contact between the measuring path and the magnet. In such embodiments, in the position to be determined, there will always be a point which the magnet, or a reference point of the magnet (for example its volume midpoint), is closest to while it is further away from the other points.

The relative position of the magnet relative to the row of sensors can be changed in the direction of the row direction or in a direction parallel to the row direction. For example it is possible to conceive of embodiments in which the magnet is arranged on one side next to the row of sensors. In such an embodiment, a device to be employed in the method can have a guide for moving the magnet which guides the magnet as it moves relative to the row of sensors such that the magnet moves parallel to the row direction. However, it is also possible to conceive of embodiments in which an annular magnet, which surrounds the row of sensors and of which the center of gravity is situated on the row of sensors, is employed as the magnet. In such an embodiment, the movement of the annular magnet can be guided by the row of sensors, or a housing surrounding the row of sensors, such that the magnet moves in the row direction, namely its center of gravity situated on the row of sensors is moved in the row direction. In this case, the benefits of the invention can already be achieved if the magnet, which is also referred to as a transmitter, moves at an angle to the row direction but has a movement component which points in the row direction. In this case, it is preferred if the movement component which points in the row direction is larger than the movement component which points perpendicular to the row direction. For example, it is possible to conceive of instances of application in which the magnet is designed as a float and in which the level of a liquid on which the magnet is floating is meant to be determined, wherein the container which receives the liquid and the magnet has a somewhat larger diameter than the magnet. If, in such cases, the row of sensors is provided in the container wall for example, the spacing between the magnet and the row of sensors can change while the liquid level changes, because the magnet can perform movements on the surface of the liquid through the free space provided by the larger diameter of the container. In such an instance of application, the magnet would not move perfectly parallel to the row of sensors. The method according to the invention can nevertheless also be employed in such an instance of application. A comparable situation applies in the case of measuring tasks in which an annular magnet is moved along a row of sensors designed as a rod, but its spacing to the row of sensors changes slightly due to the clearance provided for the movement.

For the invention to be a success, all that is required is that the relative position between the magnet and the row of sensors is changed. It is not required that the magnet is moved relative to a stationary row of sensors. In an embodiment, the magnet is mobile relative to the row of sensors. In an alternative embodiment, the row of sensors is mobile relative to the magnet. Finally, it is possible to conceive of embodiments in which both the magnet and the row of sensors can be moved in a coordinate system which is not firmly connected to the magnet and which is not firmly connected to the row of sensors such that the relative position of the magnet changes relative to the row of sensors.

The method according to the invention can be carried out once. If there are a first sensor signal and a second sensor signal then the method can be employed to establish the position in which the magnet was situated at the point in time in which the first sensor generated the first sensor signal and the second sensor generated the second sensor signal. In an embodiment, the respective sensor signal of the respective sensor is generated permanently, particularly preferably as an analogue signal. As a result it is possible to permanently carry out the determination of the position in which the magnet is situated. For this purpose, the sensor signals are scanned by an evaluation unit with a scanning frequency. In an embodiment, the sensor signals are scanned with a scanning frequency of greater than 200 Hz, particularly preferably of greater than 500 Hz, particularly preferably of >1 kHz and most particularly preferably of greater than 5 kHz. In an embodiment, on the basis of each data set of sensor signals which is ascertained in a scan, a determination is carried out as to the position in which the magnet was situated at the point of time when the sensor signals which form the basis of the data set were generated.

In an embodiment, there is generated a magnetic support field, the field direction of which, in the region of the magnetic-field-sensitive sensors, points substantially in the direction of the row direction. It has emerged that, in particular with specific designs of the magnetic-field-sensitive sensors, particularly preferably with AMR sensors due to the lack of a north-south distinction which is inherent in this sensor principle, the employment of a support field improves the unique nature of the sensor signals and thus makes a larger unambiguously evaluable measuring region possible using a smaller number of sensors. In this case it has been shown that this effect can be obtained particularly well if the sensors mainly detect field components which are oriented perpendicular to the direction of magnetization of the magnet used.

In an embodiment, the magnet has a magnetization which points in a direction parallel to the row direction or which points in the row direction. Particularly preferably, the magnetic field generated by the magnet, in the region of the magnetic-field-sensitive sensor elements at the level of the magnet, points substantially in the direction of, or in the direction counter to, the row direction. Particularly preferably, its field strength is smaller, in terms of amount, at least at a location in the region of the magnetic-field-sensitive sensor elements, than the field strength of the support field at this location. It has been possible to observe that when a magnet is designed to be magnetized axially in a direction parallel to the row direction, this magnet generates a strong field in the axial direction precisely in the region close to the sensors. When a magnetic support field is employed which, in the field direction in the region of the magnetic-field-sensitive sensor, substantially points in the direction of the row direction, this can lead to a strengthening of the support field, when the polarity of the magnet is oriented accordingly. If the polarity of the magnet is rotated by 180°, the magnetic field generated by the magnet leads to a weakening of the support field. As a result, the characteristic lines of the progressions of the sensor signals over the regions become generally steeper. As a result, greater ambiguities can arise, above all in the event of narrow magnets and greater spacings between the sensors. At the same time, the characteristic lines could flatten out in the region of the ends of the measuring region. This effect can be reduced if the support field is strengthened compared to the axially parallel field of the magnet. However, at the same time, the modulation of the sensor deteriorates, which means that offset errors and offset drift can occur in a more pronounced manner.

In a further embodiment, the magnet has a magnetization which points in a direction perpendicular to the row direction or which is radial relative to the direction of movement. Particularly preferably, the magnetic field generated by the magnet, in the region of the magnetic-field-sensitive sensor elements at the level of the magnet, points substantially perpendicular to the row direction. Particularly preferably, its field strength is smaller, in terms of amount, at least at a location in the region of the magnetic-field-sensitive sensor elements, than the field strength of the support field at this location. In this arrangement, the support field is particularly preferably oriented perpendicular to the longitudinal direction of the row. This arrangement is advantageous in particular in the case of transmitter magnets which are formed in a rotationally symmetrical manner relative to the longitudinal direction of the row or arranged radially symmetrical and/or freely rotatable about the longitudinal axis of the row of sensors, because due to reasons of symmetry in this case no evaluable field components occur which are orthogonal to the longitudinal direction of the row.

In an embodiment, in particular when determining piston positions in compressed-air or hydraulic cylinders, the magnet is an axially magnetized disc magnet, bar magnet or annular magnet which is axially symmetrical relative to the direction of movement and which is guided along laterally beside the row of sensors.

In a further preferred embodiment, if the magnetic transmitter is arranged symmetrically and freely rotatably around the longitudinal direction of the row, in particular in the case of determining the position of a float of a fill-level gauge for liquids, radially magnetized rings or individual magnets which are arranged radially symmetrically are preferably used as the magnets.

In an embodiment, the magnetic-field-sensitive sensors are magnetoresistive sensors, each sensor having a bridge (barber pole stripes or 45° stripes, or sin-bridge). When such sensors are used, it is preferable that a support field which is not meant to be smaller than the strongest field to be measured acts transverse to the field direction to be measured.

In an embodiment, the magnetic-field-sensitive sensors use the GMR or TMR effect. Such sensors do not necessarily require support fields for safe operation, but the use of support fields can be used to adapt the sensor sensitivity and thus the measuring region, in particular the largely linear part of the measuring region, to the field strengths which arise.

In an embodiment, the magnetic-field-sensitive sensors use the Hall effect or, in the form of magnetoresistors, the Gauss effect which is associated therewith.

In an embodiment, magnetoresistive sensors are employed as magnetic-field-sensitive sensors. In a particularly preferred embodiment, AMR sensors (anisotropic magnetoresistive sensors) with barber poles are employed. The support field generated by the support field device envisaged in an embodiment can be employed in such an embodiment to ensure a reliable magnetic saturation of the sensor material at each transmitter position.

Magnetic field-sensitive sensors, in particular magnetoresistive sensors, in particular barber-pole sensors, frequently have a progression of the characteristic line which, for each field strength of the magnetic field component of a magnetic field in the sensor which is generated by a magnetic field-generating transmitter, reflects a value of the relationship of the strength of the sensor signal generated by the sensor relative to the maximum sensor signal able to be generated by the sensor, which progression is substantially linear only in a partially small field strength region of the magnetic field component and runs non-linearly adjacent to the section of the characteristic line which runs substantially linearly.

In an embodiment, the respective sensor has a full-bridge arrangement (Wheatstone bridge) of magnetoresistive elements or a half-bridge circuit of such magnetoresistive elements.

In an embodiment, the magnetic-field-sensitive sensors are magnetoresistive sensors. In particular, the respective sensor can have the "anisotropic-magnetoresistive effect" (AMR effect) or the "giant" magnetoresistive effect (GMR effect). The sensor element can however also have other effects, such as the Giant Magneto Impedance (GMI), the Tunnel Magneto Resistance effect (TMR) or the Hall effect, for example.

The method according to the invention is particularly preferably used when determining the level of a liquid, when the magnet is designed as a float. The method according to the invention can also be used, for example, in measuring situations in which an examination is to be carried out as to whether or not a mobile object has exceeded a switching point (the reference position). This can be used, for example, when examining switches or valves in which the intention is to check whether the switch or valve has exceeded a predetermined opening position. A further preferred area of use is the determination of the absolute position or the relative situation compared to a given position of a piston in shock absorbers, compressed-air or hydraulic cylinders, wherein the piston contains the transmitter magnet and the row of sensors is attached to the outer wall of the cylinder. The method according to the invention can also be employed as a potentiometer replacement.

BRIEF DESCRIPTION OF THE DRAWINGS

The invention will be described hereafter using drawings which merely depict exemplary embodiments of the invention in greater detail. In the drawings:

FIG. 6 is a spatial arrangement of the resistors of a sensor, such as can be employed in the device according to the invention, FIG. 7 is a schematic of an interconnection of the resistors of the sensor according to FIG. 6, such as can be employed in the device according to the invention.

DETAILED DESCRIPTION OF THE EMBODIMENT(S)

Figure 1:
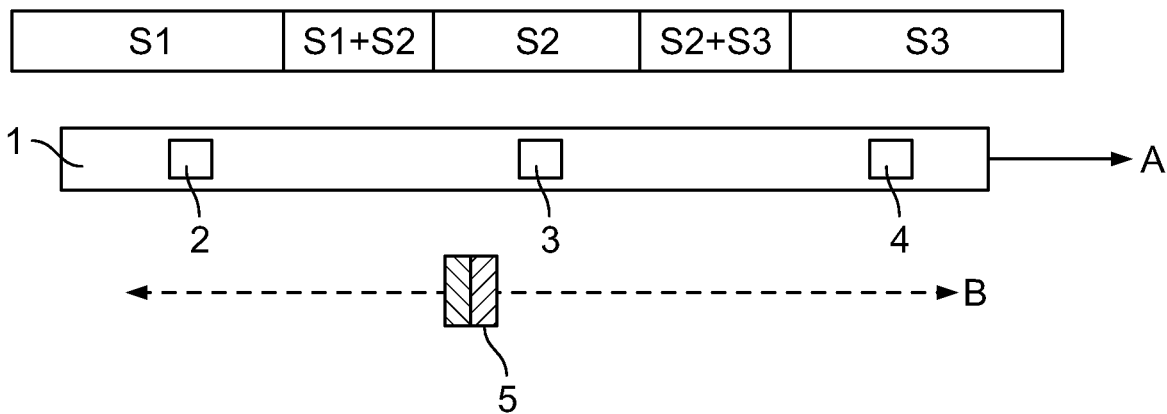
FIG. 1 is a plan view of a device such as can be employed to carry out the method according to the invention.

The device shown in FIG. 1 has a row of sensors 1. A first magnetic-field sensor 2, a second magnetic-field sensor 3 and a third magnetic-field sensor 4 are arranged on the row of sensors, spaced apart from one another in row direction A. The embodiment depicted in FIG. 1 is a row of sensors 1 which extends linearly. Additional sensors which are not depicted can follow the third sensor 4 in row direction A.

The device has a magnet 5. It can be moved relative to the row of sensors in the direction of the double arrow B and thus in a direction parallel to row direction A.

The magnet generates a magnetic field (not depicted in greater detail), wherein, in the embodiment depicted here, the direction of magnetization of the magnet (the direction pointing from the north pole to the south pole of the magnet) corresponds to the direction of movement B of the magnet 5 and thus runs parallel to the row direction A.

Five regions are indicated by shading above the row of sensors 1; region S1, region S1+S2, region S2, region S2+S3 and region S3. To determine the position of the magnet 5 relative to the row of sensors, the signal of the first sensor 2 is to be used as the leading signal if the magnet 5 is situated closest to region S1. To determine the position of the magnet 5 relative to the row of sensors, the signal of the first sensor 2 or of the second sensor 3 or a signal derived from the signal of the first sensor 2 and from the second sensor 3 is to be used as the leading signal if the magnet 5 is situated closest to region S1+S2. To determine the position of the magnet 5 relative to the row of sensors, the signal of the second sensor 3 is to be used as the leading signal if the magnet 5 is situated closest to region S2. To determine the position of the magnet 5 relative to the row of sensors, the signal of the second sensor 3 or of the third sensor 4 or a signal derived from the signal of the second sensor 3 and from the third sensor 4 is to be used as the leading signal if the magnet 5 is situated closest to region S2+S3. To determine the position of the magnet 5 relative to the row of sensors, the signal of the third sensor 4 is to be used as the leading signal if the magnet 5 is situated closest to region S3.

Figure 2:
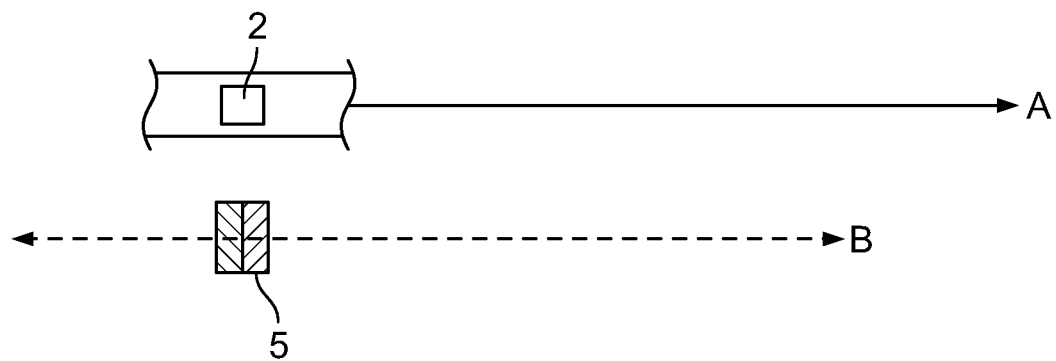
FIG. 2 is a cut-out from the device depicted in FIG. 1 with a sensor and a magnet.

FIGS. 2, 3, 4 and FIG. 5, when viewed together, depict the generation of a sensor signal (FIG. 5) of an individual sensor. As an example, FIG. 2 shows the first sensor 2, the section of the row of sensors 1 adjacent to the first sensor 2, and the magnet 5 and its direction of movement B which runs parallel to the row direction A. The graphs depicted in FIGS. 3, 4 and 5 use the midpoint of the sensor 2 as a reference point.

The schematic design of the sensor 2, which is configured as a rotation angle sensor, is depicted in FIGS. 6 and 7. The sensors 3 and 4 have the same design. The respective sensor has a first part (resistors R1, R2, R3, R4) which generates a first intermediate signal, and a second part (resistors R5, R6, R7, R8) which generates a second intermediate signal, the progression of the first intermediate signal and the progression of the second intermediate signal being dependent on the direction of the magnetic field generated by the magnet 5. The first intermediate signal substantially has a sine-type progression (cf. FIG. 3) for the applied voltage U sin. The second intermediate signal substantially has a cosine-type progression (cf. FIG. 4) for the applied voltage U cos. As can be seen from FIG. 7, the midpoint of the first part corresponds to the midpoint of the second part. The resistors are resistors which use the anisotropic magnetoresistance (AMR) effect.

Figure 3:
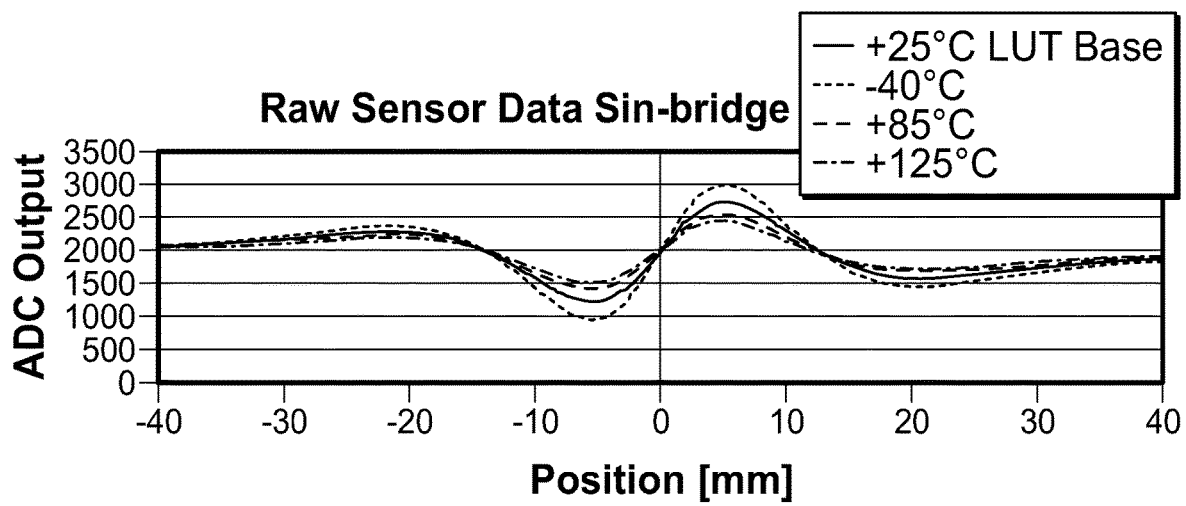
FIG. 3 is a graph showing the progression of the first intermediate signal (sine signal) that a first part of the sensor according to FIG. 2 generates depending on the position of the magnet relative to this sensor.
Figure 4:
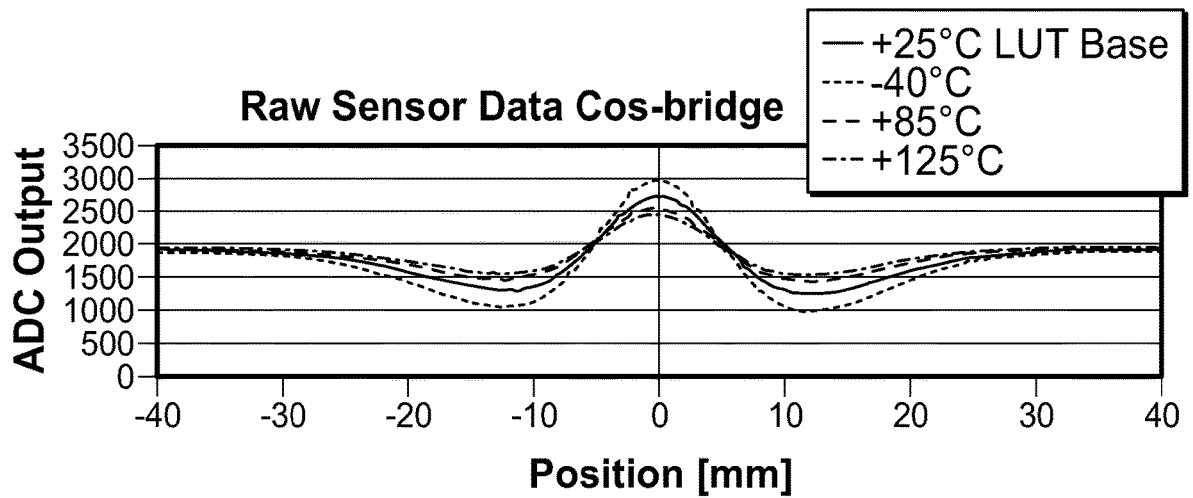
FIG. 4 is a graph showing the progression of the second intermediate signal (cosine signal) that a second part of the sensor according to FIG. 2 generates depending on the position of the magnet relative to this sensor.
Figure 5:
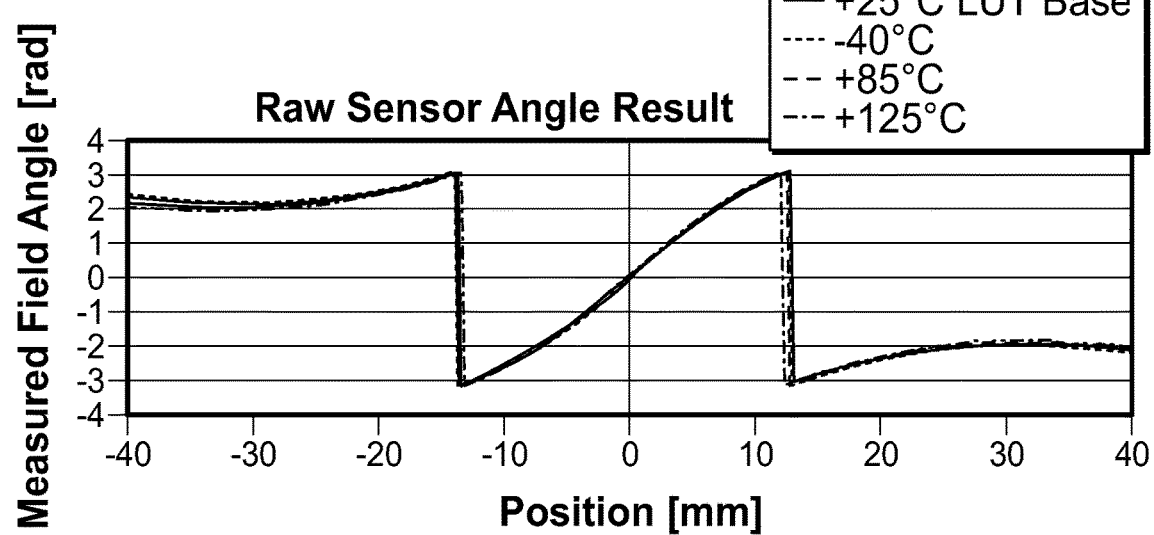
FIG. 5 is a graph showing the progression of the sensor signal (ArcTan signal) generated from the first intermediate signal and the second intermediate signal.

The sine- and cosine-type intermediate signals (FIG. 3 and FIG. 4 show their progressions at various ambient temperatures (25° C., −40° C., 85° C., 125° C.)) of the sensor 2 can be used in order to determine the field direction progression at the location of the sensor 2. The field angle can be obtained in a simple manner by dividing the two values of the intermediate signals at the respective time of measurement followed by calculation of the arctangent. (field angle=0.5*ARCTAN(Uasin/Uacos)). The progression of the sensor signal calculated in this way is depicted in FIG. 5 (likewise for the various ambient temperatures).

FIG. 6 shows in this case the spatial arrangement of the Wheatstone bridge of the first part (resistors R1, R2, R3, R4) relative to the Wheatstone bridge (resistors R5, R6, R7, R8) of the second part. Furthermore, the row direction A of the row of sensors and the direction of movement B of the magnet 5 are indicated in FIG. 6. The Wheatstone bridges, the row direction A and the direction of movement B of the magnet are substantially situated in one plane.

FIG. 7 shows the electric interconnection of the resistors, without reproducing the precise spatial arrangement of the resistors. Alternating voltages U sin and U cos are respectively applied to the bridges. The first intermediate signal is tapped at point Vcc in the left circuit of FIG. 7, and the second intermediate signal is tapped at point Vcc in the right circuit of FIG. 7.

FIG. 3 shows the value of the first intermediate signal (sine signal) in relation to the relative position of the magnet 5 relative to the middle of the sensor 2 (zero position) for various ambient temperatures. FIG. 4 shows the value of the second intermediate signal (cosine signal) in relation to the relative position of the magnet 5 relative to the middle of the sensor 2 (zero position) for various ambient temperatures. FIG. 5 shows the value of the sensor signal of sensor 2, which is calculated by the division of the two signal values followed by calculation of the arctangent, in relation to the relative position of the magnet 5 relative to the middle of the sensor 2 (zero position) for various ambient temperatures. It is recognized that the sensor 2 supplies a unique signal for a particular region—for the region of approx. −12 mm to +12 mm around the midpoint of the sensor 2 in the exemplary embodiment depicted here. By employing an appropriate lookup table or an appropriate conversion factor, it is possible to unambiguously determine the position of the magnet 5 relative to the midpoint of the sensor 2 for the region of −12 mm to +12 mm around the midpoint of the sensor 2. If the position of the midpoint of the sensor 2 on the row of sensors 1 is known, then, by evaluating the sensor signal of the sensor 2, it is thus also possible to determine the absolute position of the magnet 5 relative to the row of sensors 1, if it is situated in the region of −12 mm to +12 mm around the midpoint of the sensor 2. By suitably selecting a sensor and the region associated thereto in which the sensor can unambiguously determine the position of the magnet relative to itself, and by suitably arranging two or more sensors one after the other in the row direction, it is possible to generate a measuring region in which, with regard to each position of the magnet in this measuring region, at least one sensor can supply a unique signal for determining the position of the magnet relative to itself. Knowing the position of the individual sensors on the row of sensors, it is thus possible to unambiguously determine the absolute position of the magnet relative to the row of sensors if the magnet is situated in the measuring region.

Figure 8:
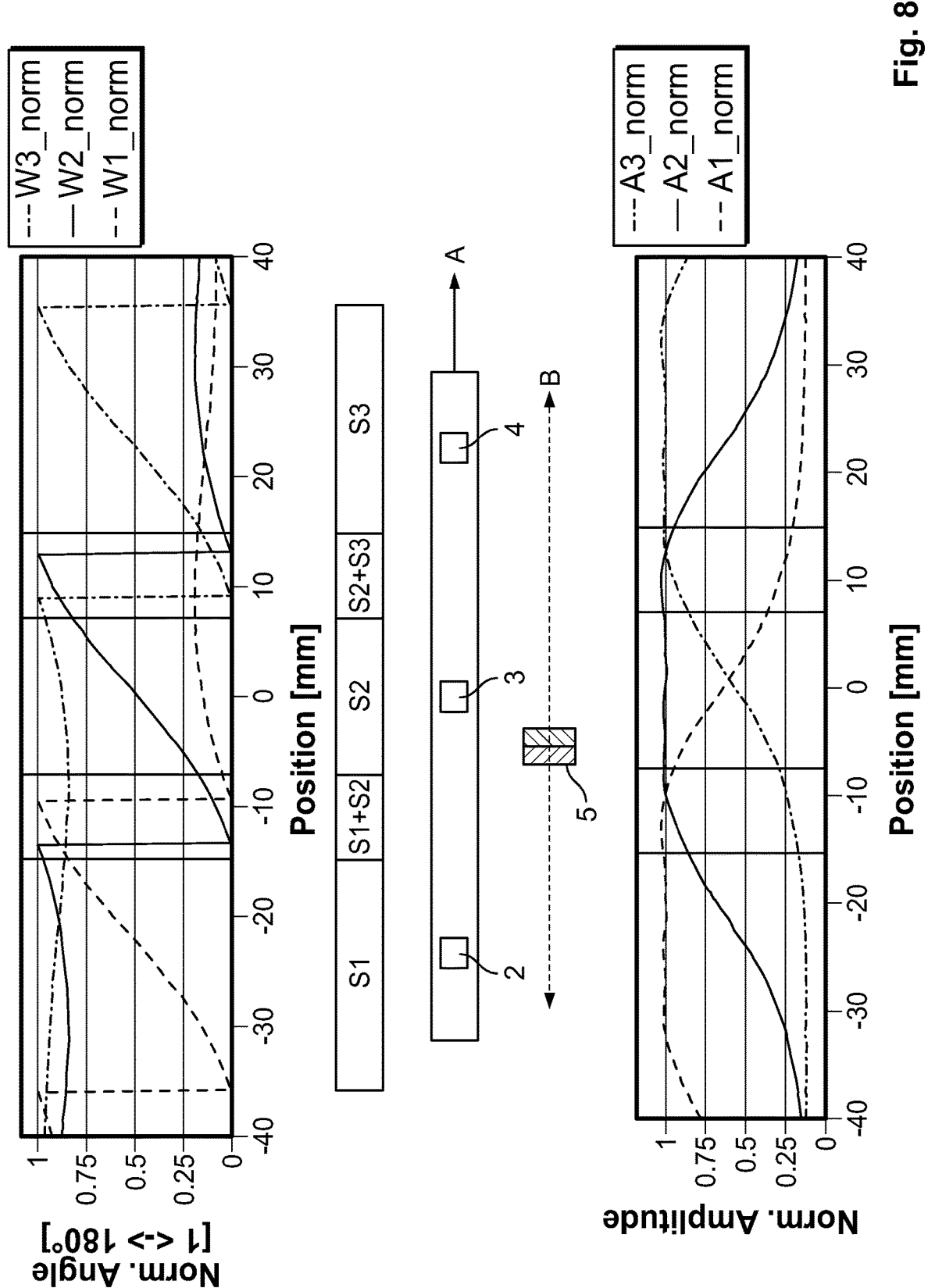
FIG. 8 is a graph that, in summary, shows the progressions of the sensor signals of the first sensor, second sensor and third sensor with a device, such as can be employed to carry out the method according to the invention, with a graph showing the progression of the relative values of the first sensor, second sensor and third sensor which are ascertained from the intermediate signals of the sensors.

In its upper region, FIG. 8 shows a graph which shows the progression of the normalized sensor signals of the first sensor (W1_norm), of the second sensor (W2_norm) and of the third sensor (W3_norm). The normalized signal is generated in that the angles which result from the ArcTangent calculation are divided by 180°, and thus are normalized to a value range of 0 to 1. It must be recognized that, in the embodiment described here, the individual measuring regions of the sensor, in terms of their expansion (−12 mm to +12 mm around the midpoint of the respective sensor), and the arrangement of the sensors relative to one another were selected such that at least one sensor supplies a signal in each of the regions S1, S1+S2, S2, S2+S3, S3 which allows the position of the magnet 5 to be determined unambiguously relative to it. The midpoint of the second sensor 3 was selected as a reference point. In the region S1, the first sensor 2 supplies a signal that allows the unambiguous determination of the position of the magnet relative to it and, knowing the location of the midpoint of the sensor 2 on the row of sensors 1, also relative to the row of sensors 1. In the region S2, the second sensor 3 supplies a signal that allows the unambiguous determination of the position of the magnet relative to it and, knowing the location of the midpoint of the sensor 3 on the row of sensors 1, also relative to the row of sensors 1. In the region S3, the third sensor 4 supplies a signal that allows the unambiguous determination of the position of the magnet relative to it and, knowing the location of the midpoint of the sensor 4 on the row of sensors 1, also relative to the row of sensors 1.

In region S1+S2, the signal of the first sensor jumps from the unambiguous measuring region (to the left of it) into a region in which the signal cannot be used well for position determination (region to the right of the jump). Likewise, in region S1+S2, the signal of the second sensor jumps from the unambiguous measuring region (to the right of it) into a region in which the signal cannot be well used for position determination (region to the left of the jump). The limits of the region are, for illustration purposes, selected to be slightly far and will ideally be pulled up as closely as possible from the right, or from the left, to the respective jump. However, it can be recognized that between the two jumps, both the signal of the first sensor (W1_norm) and the signal of the second sensor (W2_norm) are situated in a region in which the position could be well determined by having recourse to the respective signal. Both signals lend themselves to determining position.

In region S2+S3, the signal of the second sensor jumps from the unambiguous measuring region (to the left of it) into a region in which the signal cannot be well used for position determination (region to the right of the jump). Likewise, in region S2+S3, the signal of the third sensor jumps from the unambiguous measuring region (to the right of it) into a region in which the signal cannot be well used for position determination (region to the left of the jump). The limits of the region are, for illustration purposes, selected to be slightly far and will ideally be pulled up as closely as possible from the right, or from the left, to the respective jump. However, it can be recognized that between the two jumps, both the signal of the second sensor (W2_norm) and the signal of the third sensor (W3 norm) are situated in a region in which the position could be well determined by having recourse to the respective signal. Both signals lend themselves to determining position.

In order to simplify the reference, the depiction from FIG. 1 is once again shown in the middle of FIG. 8.

In its lower region, FIG. 8 shows a graph which shows the progression of the normalized amplitudes of the first sensor 2 (A1_norm), of the second sensor 3 (A2_norm) and of the third sensor 4 (W3_norm) depending on the position of the magnet relative to the reference point (midpoint of the second sensor 3). The amplitude (A) is calculated from the square root of the sum of the square of the value (W1) of the first intermediate signal and of the square of the value (W2) of the second intermediate signal of a sensor at the time of measurement (A=(W12+W22)1/2 or in other words: A=(W1^2+W2^2)^1/2). The normalized amplitudes are based on the normalized intermediate signals W1 and W2, which are substantially sine- and cosine-shaped. The normalization of the intermediate signals is achieved through an upstream calibration round in which a maximum factor of the studied intermediate signals W1 and W2 of all sensors is calculated. By means of this, all intermediate signals are normalized relative to one another in the region +/−1 which in turn leads to the normalized amplitudes which arise from this moving, with the above-described calculation rule, in the value range between 0 and 1.

Figure 9:
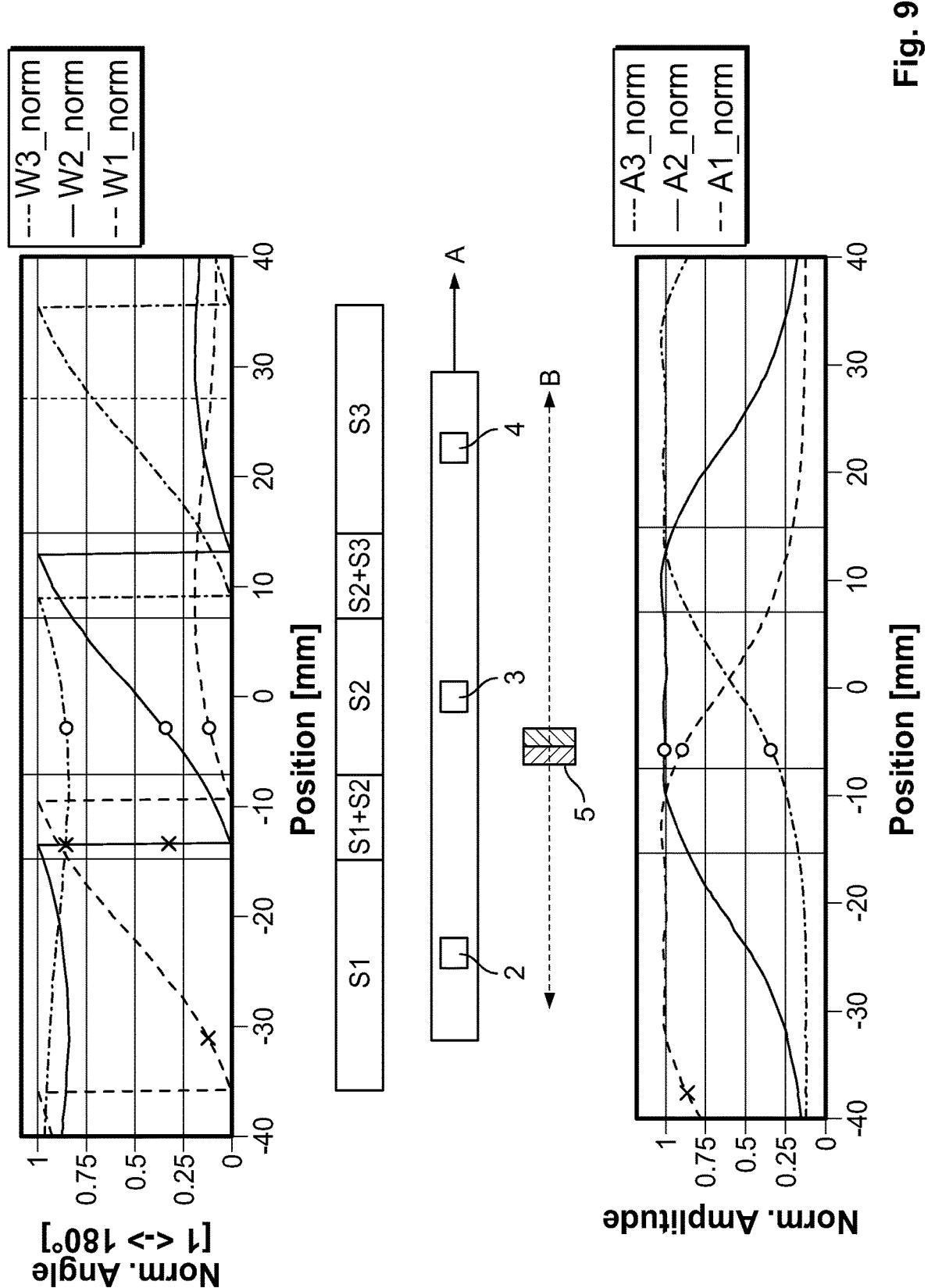
FIG. 9 is a graph similar to FIG. 8, wherein the graphs show no progressions but rather the measured values at a time of measurement.

FIG. 8 shows the progressions (W1_norm, W2_norm, W3_norm, A1_norm, A2_norm, A3_norm) of the respective values as result for the possible positions of the magnet 5 along direction of movement B. In addition to what is shown in FIG. 8, FIG. 9 shows the values as obtained at one time of measurement, namely the time of measurement in which the magnet 5 takes the position depicted in FIG. 9. These values are depicted as points. At the same time, it is emphasized by X that the respective value in the progression of the measured value would also result at other positions of the magnet 5 relative to the row of sensors. As a result, it becomes clear that there is an ambiguity.

For the method according to the invention, it was now recognized that, despite this ambiguity, it is possible to unambiguously determine the position of the magnet 5 relative to the row of sensors. With the method according to the invention, for the respective time of measurement the signal or the sensor is ascertained as leading, in which the value of the sensor at the time of measurement is situated in the unambiguous measuring region of the sensor (in the progression depicted in FIG. 5, for example the progression from −12 mm to +12 mm around the midpoint of the respective sensor 2). At the time of measurement depicted in FIG. 9, that would be the value of the second sensor 3.

In the method according to the invention, in a first examination, the value that the first sensor signal has generated at the time of measurement (the value of the signal W1_norm) is compared with a first reference value (here 0.5). In a second examination, the value that the second sensor signal has generated at the time of measurement (the value of the signal W2_norm) is compared with a first reference value (here 0.5). In a fourth examination, the value that the third sensor signal has generated at the time of measurement (the value of the signal W2_norm) is compared with a first reference value (here 0.5).

In the normalized depiction of the upper graphs of FIG. 8 and FIG. 9, the value 1 corresponds to the value 180° and the value 0.5 corresponds to the value 90°. The degree values relate to the angle between the field direction, measured by the respective sensor at the time of measurement, of the magnetic field generated by the magnet 5 relative to a preferred direction. In the first examination, an examination is thus carried out, for example, as to whether the angle between the field direction of the magnetic field at the first sensor and the preferred direction of the first sensor is greater than 90° (in the normalized depiction: greater than 0.5). If this is the case, then, the value 1 is output as a result of the first examination, and if this is not the case then the value 0 is output as a result of the first examination. The preferred directions for each sensor are identical.

As FIG. 9 shows:

a. the first sensor signal at the time of measurement is <0.5, so that the result of the first examination is 0, b. the second sensor signal at the time of measurement is <0.5, so that the result of the second examination is 0, and c. the third sensor signal at the time of measurement is >0.5, so that the result of the third examination is 1.

However, this result is not yet unambiguous. The same result would emerge if the magnet was situated in the position depicted in the upper graph in FIG. 9 by a vertical, dashed line. Here too:

d. the first sensor signal is <0.5, such that the result of the first examination would give 0, e. the second sensor signal is <0.5, such that the result of the second examination would give 0, f. the third sensor signal is >0.5, so that the result of the third examination would give 1.

The method according to the invention therefore proposes carrying out a further examination of the sensor signals, or of signals derived from the sensor signals or from intermediate signals of the sensors in order to determine unambiguously which signal is to be taken as the leading signal, or whether the magnet is situated in an intermediate region (region S1+S2 or region S2+S3).

A possibility of avoiding ambiguities consists in ascertaining the amplitudes (A) of the sensors at the time of measurement and comparing them to one another, wherein the amplitude (A) is calculated from the square root of the sum of the square of the value (W1) of the first intermediate signal and of the square of the value (W2) of the second intermediate signal of a sensor at the time of measurement (A=(W12+W22)1/2 or in other words: A=(W1^2+W2^2)^1/2).

Figure 10:
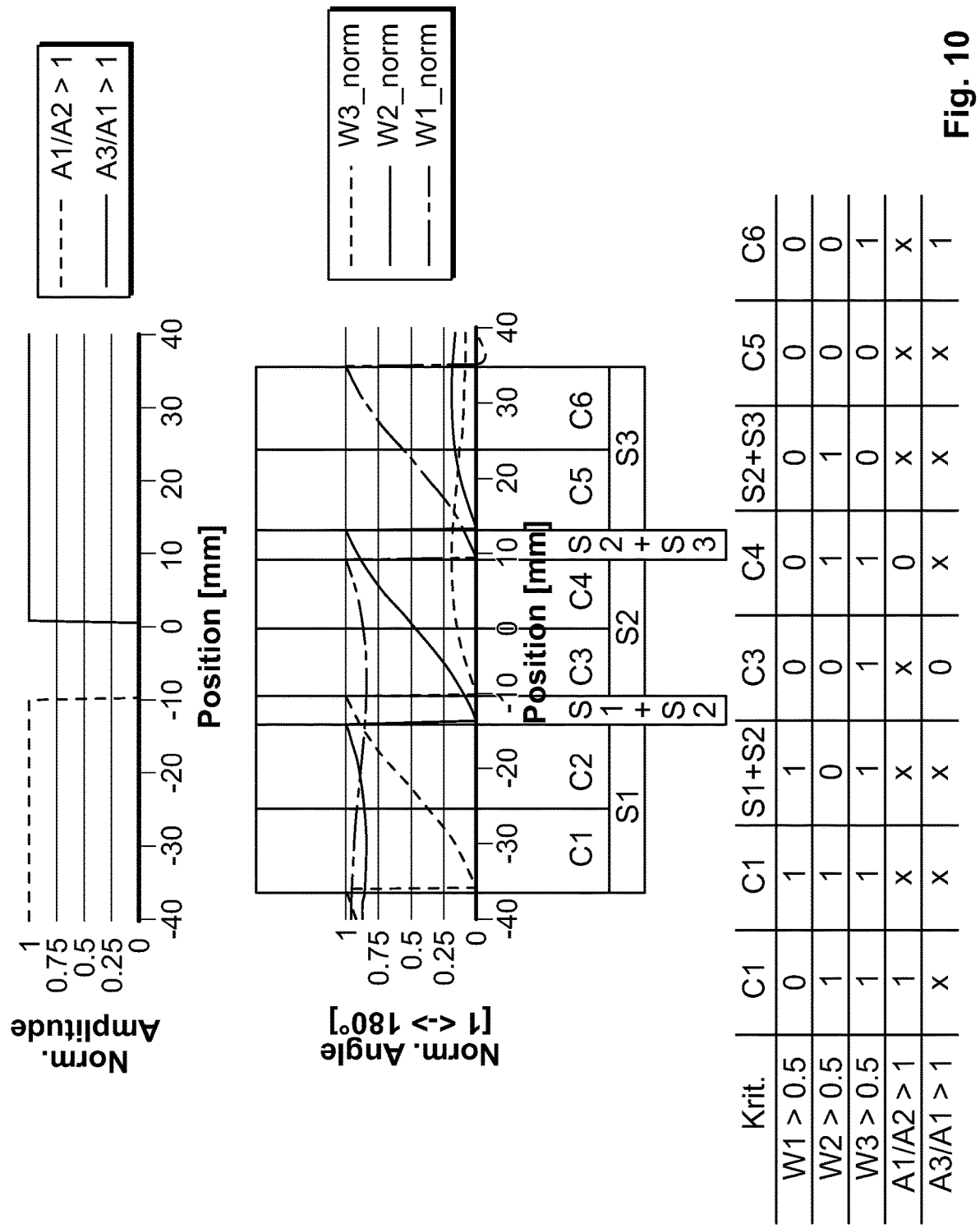
FIG. 10 is a graph, which, in summary, shows the progressions of the sensor signals of the first sensor, second sensor and third sensor with a graph showing the progression of the amplitude ratio of the first amplitude to the second amplitude and the progression of the amplitude ratio of the first amplitude to the third amplitude and the progression of the amplitude ratio of the third amplitude to the second amplitude, with a lookup table

FIG. 10 shows in the middle a graph, as is known also from the upper graph of FIG. 8. At the top, FIG. 10 shows a graph which shows the binary answer to the question of whether the first amplitude is greater than the second amplitude, and shows the binary answer to the question of whether the third amplitude is greater than the first amplitude. The ratio of first amplitude to second amplitude is a relative value. FIG. 10 thus shows, for the various positions of the magnet relative to the row of sensors, the binary answer (1=yes; 0=no) to the question of whether the relative value is greater than a reference value (here: 1). The ratio of third amplitude to the first amplitude is a second relative value. FIG. 10 thus shows, for the various positions of the magnet relative to the row of sensors, the binary answer (1=yes; 0=no) to the question of whether the second relative value is greater than a reference value (here: 1). FIG. 10 shows a lookup table in the lower region. Therein, the region S1 is divided into the regions C1 and C2. The region S2 is divided into the regions C3 and C4. The region S3 is divided into the regions C5 and C6. It can be recognized that there is a unique number combination for each of the regions for the value combination from the results g. of the first examination (Is the value of the signal of the first sensor greater than the signal that would be output for the field angle of 90° ?), h. of the second examination (Is the value of the signal of the second sensor greater than the signal that would be output for the field angle of 90° ?), i. of the fourth examination (Is the value of the signal of the third sensor greater than the signal that would be output for the field angle of 90° ?), j. of the third examination (Is the amplitude ratio of the amplitude of the first signal at the time of measurement to the amplitude of the second signal at the time of measurement greater than 1?), k. of the fifth examination (Is the amplitude ratio of the amplitude of the third signal at the time of measurement to the amplitude of the first signal at the time of measurement greater than 1?).

No number combination is repeated in another of the regions. As a result, through the five examinations, it is possible to state unambiguously the region in which the magnet is situated. In the table, "X" represents the values which it is not important to ascertain, because the number combination which they belong to is already unique in its own right.

In a further lookup table, it is possible to conclude that l. for the region C1 or C2, the signal of the first sensor is taken as the leading signal and the position is determined from the signal of the first sensor, m. for the region C3 or C4, the signal of the second sensor is taken as the leading signal and the position is determined from the signal of the second sensor, n. for the region C5 or C6, the signal of the third sensor is taken as the leading signal and the position is determined from the signal of the third sensor, o. for the region S1+S2, the position is determined from the signals of the first and second sensors, p. for the region S2+S3, the position is determined from the signals of the second and third sensors.

Figure 11:
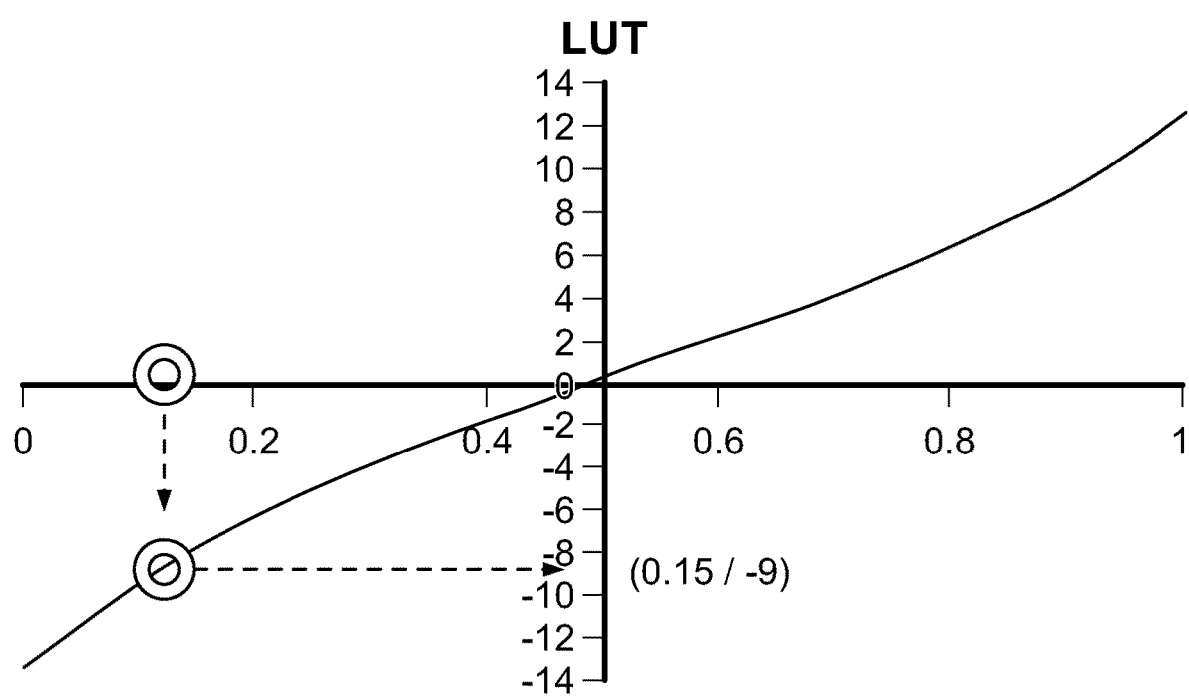
FIG. 11 is a graph based on a lookup table with which it is possible to determine the position of the magnet from the value of the leading sensor signal.

If the position is directly ascertained from one sensor signal (regions C1, C2, C3, C4, C5, C6), this can take place directly via a lookup table. For values of the sensor signal, the position value which is associated with this value of the sensor signal is stored relative to a reference point in a lookup table, in a previously selected incrementation. FIG. 11 shows a graphic depiction of the relationship between sensor signal and position value which is behind such a lookup table. If the signal value of the leading signal is 0.15, for example, then the position value (in this case: −9) stored for the value 0.15 can be read out of the lookup table. This means that at the time of measurement the magnet was −9 mm away from the reference point of the sensor which produced the leading signal. In a further lookup table, it is possible for the location of the reference point of the sensor producing the leading signal to be read out in an absolute coordinate system of the row of sensors and to be added with the position value. If the reference point of the sensor which produces the signal in this example is 20 mm away from the beginning of the row of sensors, it results that at the time of measurement the magnet was −9 mm+20 mm=11 mm away from the beginning of the row of sensors.

If the position is ascertained from the signals of two sensors, then the average value of the signal values of the sensor signals is formed first and the position is ascertained on the basis of the thus formed average value by reading out from the same lookup table, the average value being taken instead of the average sensor value of a signal.

What is claimed is:

1. A method for determining the position of a magnet at a time of measurement relative to a row of sensors comprising the steps of:

generating a first sensor signal, a value of which, at the time of measurement, depends on the position of the magnet relative to a first sensor;

generating a second sensor signal, a value of which, at the time of measurement, depends on the position of the magnet relative to a second sensor;

comparing, in a first examination, the value that the first sensor signal has generated at the time of measurement with a first reference value and/or checking whether the value belongs to a first value range;

comparing, in a second examination, the value that the second sensor signal has generated at the time of measurement with a second reference value and/or checking whether the value belongs to a second value range;

either forming a relative value from the value that the first sensor signal has generated at the time of measurement and the value that the second sensor signal has generated at the time of measurement, or forming a relative value from the value of a first intermediate signal of the first sensor at the time of measurement, and from the value of a second intermediate signal of the first sensor at the time of measurement, and from the value of a first intermediate signal of the second sensor at the time of measurement, and from the value of a second intermediate signal of the second sensor at the time of measurement; and comparing, in a third examination, the relative value with a third reference value and/or checking as to whether the relative value belongs to a third value range, and from the result of the first comparison and the result of the second comparison and the result of the third comparison, determining which of the sensor signals should be regarded as the leading signal for the time of measurement, wherein the position of the magnet relative to the row of sensors at the time of measurement is determined by evaluating the leading signal determined in this manner.

2. The method according to claim 1 wherein the relative value is generated by forming a ratio of the value that the first sensor signal has generated at the time of measurement to the value that the second sensor signal has generated at the time of measurement.

3. The method according to claim 1, wherein the relative value is generated by forming a ratio of a first amplitude, which is formed from the value of the first intermediate signal of the first sensor at the time of measurement and the value of the second intermediate signal of the first sensor at the time of measurement, to a second amplitude, which is formed from the value of the first intermediate signal of the second sensor at the time of measurement and the value of the second intermediate signal of the second sensor at the time of measurement.

4. The method according to claim 1, wherein a binary value is generated as a result of the first examination and a binary value is generated as a result of the second examination and a binary value is generated as a result of the third examination and, by comparing the value combination of the examinations with value combinations in a lookup table, a determination is carried out as to which of the sensor signals should be regarded as the leading signal for the time of measurement.

5. The method according to claim 1, wherein the row of sensors has a third magnetic-field-sensitive sensor which is arranged spaced apart from the second sensor in the row direction,
wherein
a third sensor signal is generated by the third sensor, the value of which, at the time of measurement, depends on the position of the magnet relative to the third sensor at the time of measurement, and
in a fourth examination, the value that the third sensor signal has generated at the time of measurement is compared with a fourth reference value and/or is checked as to whether it belongs to a fourth value range, and
either a second relative value is formed from the value that the second sensor signal has generated at the time of measurement, or the value that the first sensor signal has generated at the time of measurement, and the value that the third sensor signal has generated at the time of measurement,
or a second relative value is formed from the value of a first intermediate signal of the second sensor at the time of measurement that has been used to generate the value of the second sensor signal, and from the value of a second intermediate signal of the second sensor at the time of measurement that has been used to generate the value of the second sensor signal, or from the value of a first intermediate signal of the first sensor at the time of measurement that has been used to generate the value of the first sensor signal, and from the value of a second intermediate signal of the first sensor at the time of measurement that has been used to generate the value of the first sensor signal, and from the value of a first intermediate signal of the third sensor at the time of measurement that has been used to generate the value of the third sensor signal, and from the value of a second intermediate signal of the third sensor at the time of measurement that has been used to generate the value of the second sensor signal, and
in a fifth examination, the second relative value ascertained in this manner is compared with a fifth reference value and/or is checked as to whether it belongs to a fifth value range, and from the result of the first examination and the result of the second examination and the result of the third examination and the result of the fourth examination and the result of the fifth examination, a determination is carried out as to which of the sensor signals should be regarded as the leading signal for the time of measurement, wherein the position of the magnet relative to the row of sensors at the time of measurement is determined by evaluating the leading signal determined in this manner.

6. The method according to claim 5, wherein the relative value is generated by forming a ratio of the value that the first sensor signal has generated at the time of measurement to the value that the second sensor signal has generated at the time of measurement, and the second relative value is generated by forming a ratio of the value that the third sensor signal has generated at the time of measurement to the value that the second sensor signal has generated at the time of measurement, or to the value that the first sensor signal has generated at the time of measurement.

7. The method according to claim 5, wherein the relative value is generated by forming a ratio of a first amplitude that is formed from the value of the first intermediate signal of the first sensor at the time of measurement and the value of the second intermediate signal of the first sensor at the time of measurement, to a second amplitude that is formed from the value of the first intermediate signal of the second sensor at the time of measurement and the value of the second intermediate signal of the second sensor at the time of measurement, and the second relative value is generated by forming a ratio of a third amplitude that is formed from the value of the first intermediate signal of the third sensor at the time of measurement and the value of the second intermediate signal of the third sensor at the time of measurement, either to a second amplitude that is formed from the value of the first intermediate signal of the second sensor at the time of measurement and the value of the second intermediate signal of the second sensor at the time of measurement, or to a first amplitude that is formed from the value of the first intermediate signal of the first sensor at the time of measurement and the value of the second intermediate signal of the first sensor at the time of measurement.

8. The method according to claim 5, wherein a binary value is generated as a result of the first examination and a binary value is generated as a result of the second examination and a binary value is generated as a result of the third examination and a binary value is generated as a result of the fourth examination and a binary value is generated as a result of the fifth examination and, by comparing the value combination of the examinations with value combinations in a lookup table, a determination is carried out as to which of the sensor signals should be regarded as the leading signal for the time of measurement.

9. The method according to claim 1, wherein the first sensor and/or the second sensor and/or the third sensor is a rotation angle sensor.

10. The method according to claim 1 wherein, based on the leading signal or a value derived from the leading signal, a position value for determining the position of the magnet relative to the row of sensors is read out from a lookup table.

11. The method according to claim 10 wherein in order to determine the position of the magnet relative to the row of sensors, an offset value is added to the position value, wherein the offset value depends on the position along the row of sensors of the sensor which has generated the guiding signal.

12. The method according to claim 1, wherein the row of sensors is a plurality of magnetic-field-sensitive sensors.

* * * * *